United States Patent Office.

GEROME L. CROSS, OF SPRINGFIELD, MASSACHUSETTS, ASSIGNOR TO HIMSELF, GEORG K. GEIGER, AND WILLIAM D. McKENZIE, OF SAME PLACE.

COATING COMPOUND FOR BRICK-WORK.

SPECIFICATION forming part of Letters Patent No. 448,179, dated March 10, 1891.

Application filed July 5, 1890. Serial No. 357,915. (No specimens.)

*To all whom it may concern:*

Be it known that I, GEROME L. CROSS, a citizen of the United States, residing at Springfield, in the county of Hampden and State of Massachusetts, have invented new and useful Improvements in Coating Compounds for Brick-Work, of which the following is a specification.

This invention relates to a compound or solution for coating bricks, the objects being to form an impervious covering for the bricks to neutralize the effect of the sulphate of magnesia, which is inherent in the bricks, so that such agent will not render the surface of the bricks of the glazed or limy appearance commonly seen, and to uniformly color the bricks when it is so desired, that they be given any color different from that which they naturally have.

In carrying out my invention I essentially provide ingredients in substantially the proportions as follows: I dissolve one pound of glue in one quart of water by boiling, as usual in the preparation of glue for adhesive use. With this I combine one pint of muriatic acid and about a gallon and a half of soft water. The above ingredients form the base of a coating for application to brick-work, which is impervious to air and moisture. It also has such an action on the sulphate of magnesia which may be contained in and tend to exude from the bricks as to neutralize or destroy same, preventing the same from appearing as a limy scum upon the surface of the bricks. Of course, should it be desired that this coating have a color, a pound of Venitian red or other coloring body or pigment may be mixed with the muriatic acid, glue, and water.

While, as stated, muriatic acid, glue, and water in or about in the proportions stated constitute a very efficient coating for brick-work, the same is rendered of increased utility by the combination of other ingredients with said base, and the addition of a pound of common salt has been found advantageous, and a couple of ounces of ammonia, a pint of high-wine vinegar, and two ounces of alcohol may also be added, to the end of rendering the wash more effective for the purpose for which it is designed, and in practice at present I employ a coating formed of all of the ingredients named—that is, I first mix a pint of muriatic acid with a gallon and a half of water, adding one pound coarse salt, two ounces of ammonia, one pint high-wine vinegar, two ounces alcohol, and one pound of glue in solution, as secured by its treatment with a quart of boiling water, and to the ingredients, in the proportions stated, I also add a coloring-matter, as Venetian red, chrome-yellow, &c.

Having now described said improved compound, what I claim, and desire to secure by Letters Patent, is—

1. A coating compound for brick-work, composed of muriatic acid, salt, ammonia, high-wine vinegar, alcohol, glue, and water, in substantially the proportions stated.

2. A coating and coloring compound for brick-work, composed of muriatic acid, salt, ammonia, high-wine vinegar, alcohol, glue, water, and a coloring body, in substantially the proportions stated.

GEROME L. CROSS.

Witnesses:
 WM. S. BELLOWS,
 H. A. CHAPIN.